(No Model.)
G. M. BRILL.
CAR TRUCK.
No. 339,041. Patented Mar. 30, 1886.
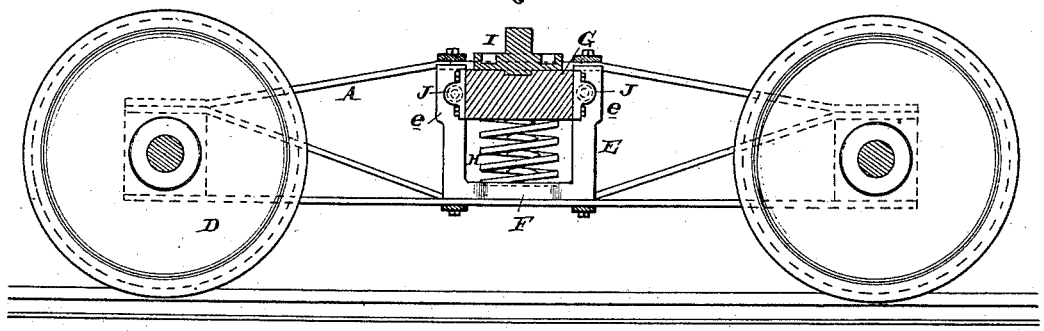
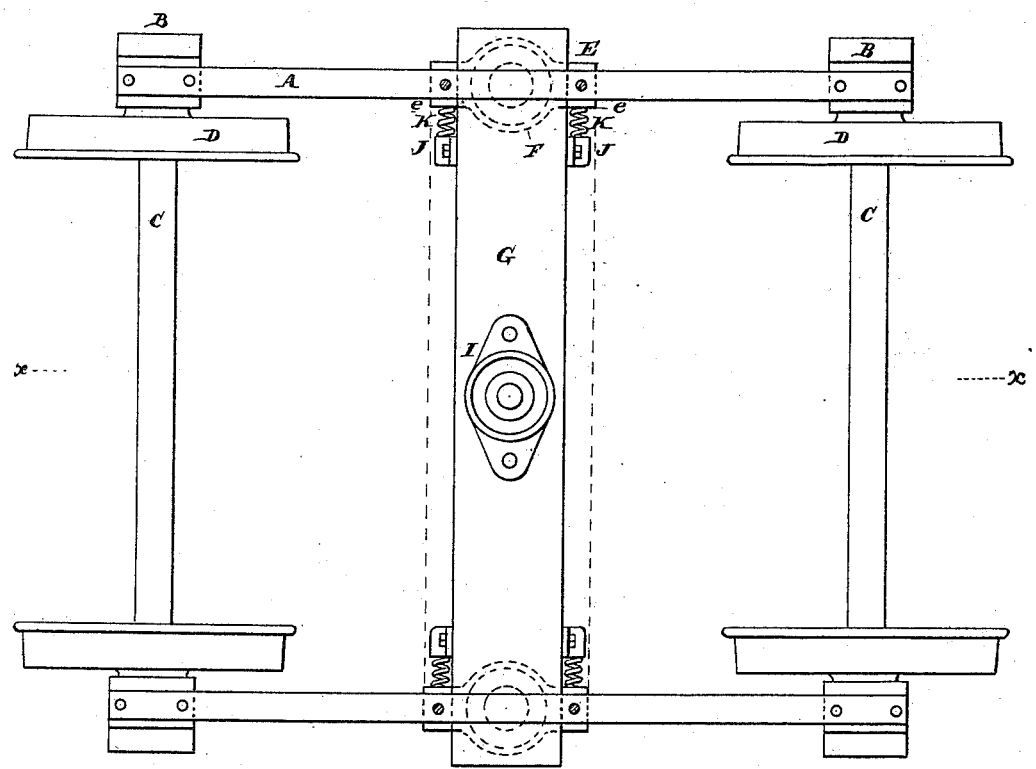
Attest
E. W. Breckinreed
J. L. Maguire
Inventor
George M. Brill
By his atty

UNITED STATES PATENT OFFICE.

GEORGE M. BRILL, OF PHILADELPHIA, PENNSYLVANIA, ASSIGNOR OF ONE-HALF TO JAMES RAWLE, OF SAME PLACE.

CAR-TRUCK.

SPECIFICATION forming part of Letters Patent No. 339,041, dated March 30, 1886.

Application filed November 23, 1885. Serial No. 183,701. (No model.)

*To all whom it may concern:*

Be it known that I, GEORGE M. BRILL, of the city and county of Philadelphia, and State of Pennsylvania, have invented an Improvement in Car-Trucks, of which the following is a specification.

My invention has reference to car-trucks; and it consists in certain improvements thereon by which the lower and central part of the truck is left comparatively clear by the usual hangers and cross-timbers upon which the springs rested being eliminated, all of which is fully set forth in the following specification and shown in the accompanying drawings, which form part thereof.

In railway-trucks, especially those for freight-cars, the bolster supporting the car-body rested upon springs which were placed upon a cross timber or beam hung by links from the frame of the truck. In that construction the said cross-timber and necessary bands, links, &c., acting as appendages thereto, projected so low down as to be dangerously near to the road-bed, and were often injured or broken by the car passing over a large stone or other obstruction, and also in case of a person falling under the car he was crushed to death, as there was not space sufficient over him to allow of the passage of the truck without his being struck.

The object of my invention is to simplify the construction of the truck, and at the same time increase the space between the lowermost parts thereof and the railway-bed, by removing the usual hanging links and their cross-timber and appendages, and providing other means to allow of the lateral thrust of the car-body and bolster when the car is passing around curves, and at the same time insure all parts readjusting themselves automatically, regaining their normal positions after the curves have been passed.

By this improvement the truck could pass over such a large obstruction that breakages from this cause would be reduced to a minimum, and fatal accidents would be much less frequent.

In the drawings, Figure 1 is a sectional elevation of a truck embodying my improvements, taken on line $xx$ of Fig. 2; and Fig. 2 is a plan view of the truck.

A are the side trusses or frames of the truck, and may be connected by cross-bars M or in any other suitable manner.

B are the axle-boxes, and are secured to the frames A, and in which the axles C, carrying the wheels D, are journaled.

E are guide-castings secured in the trusses A, and guide the bolster G, whose ends project through them, being capable of longitudinal and vertical movement, but incapable of lateral movement. This bolster is provided with the usual pivot-bearing, I, upon which the car-body rests, and is supported on its ends by springs H, carried upon the enlarged portions F of the guide-castings E.

K are auxiliary springs arranged between the enlarged faces $e$ of the guides E and the thrust-blocks J, bolted to the bolster G near its ends and on its sides, as shown in Fig. 2. These springs K are always under slight tension; but when the car swings around a curve the springs on one side are considerably compressed, taking the thrust due to the centrifugal force exerted on the car-body; but upon the car running upon a straight section of track the said springs readjust the bolster, bringing it into its normal position again. The enlarged bearing-faces $e$ admit of the springs K being carried down when the bolster is depressed, and at all times find adequate bearing.

While I prefer the construction shown, it is evident that the details may be modified in various ways without departing from my invention.

Having now described my invention, what I claim as new, and desire to secure by Letters Patent, is—

1. In a car-truck, the side trusses, A, axle-boxes B, axles C, and car-wheels D, in combination with the guides E, springs H, carried thereby, bolster G, held in place by said guides, and the horizontal auxiliary springs K, to receive the lateral thrust of the bolster, substantially as and for the purpose specified.

2. In a car-truck, the side trusses, A, axle-boxes B, axles C, and car-wheels D, in combination with the guides E, having the deep faces e, springs H, carried thereby, bolster G, held in place by said guides, thrust-blocks J, to receive one end of the auxiliary springs, and the horizontal auxiliary spring K, to receive the lateral thrust of the bolster, substantially as and for the purpose specified.

In testimony of which invention I hereunto set my hand.

GEORGE M. BRILL.

Witnesses:
 R. M. HUNTER,
 W. B. WEIR.